(12) United States Patent
Treaster

(10) Patent No.: US 9,138,014 B2
(45) Date of Patent: Sep. 22, 2015

(54) APPARATUS FOR EFFICIENT NUT CRACKING AND METHOD OF USING SAME

(71) Applicant: Mahlon Treaster, Harpursville, NY (US)

(72) Inventor: Mahlon Treaster, Harpursville, NY (US)

( * ) Notice: Subject to any disclaimer, the term of this patent is extended or adjusted under 35 U.S.C. 154(b) by 206 days.

(21) Appl. No.: 13/751,539

(22) Filed: Jan. 28, 2013

(65) Prior Publication Data

US 2014/0212557 A1 Jul. 31, 2014

(51) Int. Cl.
| | | |
|---|---|---|
| A47J 43/00 | (2006.01) | |
| A47J 17/00 | (2006.01) | |
| A23P 1/00 | (2006.01) | |
| A23N 5/00 | (2006.01) | |

(52) U.S. Cl.
CPC .......................................... *A23N 5/00* (2013.01)

(58) Field of Classification Search
CPC ............. A23N 5/00; A23N 5/01; A47J 43/26; A47J 43/14; A47G 19/28
USPC ............. 99/537–643; 426/484, 482; 452/132, 452/125–131; 30/120.1–120.5
See application file for complete search history.

(56) References Cited

U.S. PATENT DOCUMENTS

| | | | | |
|---|---|---|---|---|
| 1,322,393 | A | * 11/1919 | Bagby | 99/573 |
| 1,514,237 | A | 11/1924 | Tenney | |
| 2,002,289 | A | * 5/1935 | Hancock | 99/579 |
| 2,200,515 | A | * 5/1940 | Moeller | 99/573 |
| 2,294,358 | A | * 9/1942 | Aber | 99/579 |
| 2,571,214 | A | * 10/1951 | Dale | 99/582 |
| 2,722,252 | A | * 11/1955 | Kennedy | 99/580 |
| 3,561,513 | A | 2/1971 | Lindsey | |
| 3,628,580 | A | * 12/1971 | Langston | 99/578 |
| 3,871,275 | A | * 3/1975 | Quantz | 99/571 |
| 4,211,161 | A | * 7/1980 | Jourdan et al. | 99/638 |
| 4,246,700 | A | * 1/1981 | Coulon et al. | 30/300 |
| D266,893 | S | * 11/1982 | Earnest | D7/680 |
| D267,301 | S | * 12/1982 | Hunt | D7/680 |
| 4,377,970 | A | 3/1983 | Kenkel | |
| 4,466,343 | A | 8/1984 | Thompson | |
| 4,467,711 | A | 8/1984 | Oiso et al. | |
| D282,076 | S | * 1/1986 | Taylor | D15/123 |
| 4,665,814 | A | 5/1987 | Harborne et al. | |
| 4,741,265 | A | * 5/1988 | Cushman | 99/542 |
| 4,787,307 | A | 11/1988 | Rollband | |
| 4,838,155 | A | 6/1989 | Steffel | |
| 5,092,231 | A | 3/1992 | Smith | |
| 6,209,448 | B1 | 4/2001 | Hagen | |
| 6,247,396 | B1 | * 6/2001 | Rhett | 99/571 |
| 6,397,737 | B1 | * 6/2002 | Eisel | 99/571 |
| 6,541,057 | B1 | * 4/2003 | McSwain | 426/482 |
| 7,011,016 | B1 | * 3/2006 | Carriker | 99/573 |
| 2008/0282909 | A1 | * 11/2008 | Drebing et al. | 99/537 |

* cited by examiner

*Primary Examiner* — Dana Ross
*Assistant Examiner* — Gyounghyun Bae
(74) *Attorney, Agent, or Firm* — David L. Banner

(57) ABSTRACT

An apparatus for and method of using the apparatus to crack hard shelled nuts. A pair of hollow cylindrical tubes, each having both a proximal and a distal end with a chamfer at the respective proximal ends may be axially aligned with one another with their proximal ends facing one another. A nut to be cracked may be placed between the proximal ends of the spaced apart hollow cylindrical tubes. A linear compressive force may be applied to the distal ends of the two hollow cylindrical tubes the shell of the nut cracks) i.e., separates the hard shelled nut exterior shell casing from interior nutmeat). The apparatus allows hard shelled nuts like black walnuts, to be cracked with minimal damage, such as fragmentation, of the nutmeat.

9 Claims, 4 Drawing Sheets

APPARATUS FOR EFFICIENT NUT CRACKING AND METHOD OF USING SAME

FIELD OF THE INVENTION

The invention pertains to a nut cracking method and apparatus and, more particularly, to a method and apparatus for cracking walnuts and the like while minimizing the fracturing of the edible nutmeat within the nut.

BACKGROUND OF THE INVENTION

Whether grown commercially or in the wild, nuts such as black and English walnuts, hickory nuts, butternuts, and many others have an outer husk as harvested. After removal of the outer husk, a hard shell is revealed that protects the edible kernel or nutmeat located in the center of the nut. It is necessary to crack the hard shell in order to access the nutmeat, and furthermore, it is most often desirable to crack the hard shell in a fashion that prevents both the shell and the nutmeat from breaking into several small fragments that need to be painstakingly sorted. It is most desirable to crack the shell in such a manner that the shell is not difficult to separate or open and the nutmeat inside is essentially completely intact. Black walnuts in particular are considered difficult to crack without damaging the interior nutmeat, causing the English walnut to be the variety of choice for commercial production.

Many types of nut crackers are known and available on the market, ranging from familiar hand-held tools to semi- or fully-automated systems using anvils, plungers, or rotating cylinders and adjustable plates designed to perform the function of cracking nut shells and retrieving the edible nutmeats. It is usually important to prevent over-cracking the shell to avoid any substantial damage to the interior nutmeat, and allow retrieval of essentially a whole nutmeat. To accomplish this goal, it is important that the amount and location of the force used to crack the shell be applied in a fashion and appropriate amount that avoids, or at least minimizes, the transference of force to the interior nutmeat.

The following is a listing of United States patents that disclose various methods of nut cracking. The citation thereof is not an acknowledgement that any are prior art to the present invention, nor a statement that an exhaustive search has been completed.

Many attempts have been made to overcome the deficiencies found in nut cracking methods and apparatus of the prior art. The existing prior art has provided an invention relating to the shelling of nuts, particularly such nuts as coconuts, as described in U.S. Pat. No. 1,514,237 for METHOD AND APPARATUS FOR SHELLING NUTS, issued Nov. 4, 1924 to Tenney. The Tenney patent discloses a steam pre-treatment of coconuts or the like to facilitate easier separation of the meat from the coconut shell, followed by a clamping and rotational twisting of the bottom of the shell relative to the top of the shell using the mechanism described therein.

U.S. Pat. No. 3,561,513 for NUT-CRACKING MACHINE, issued Feb. 9, 1971 to Lindsey, discloses a nut cracking machine for the cracking of walnuts and the like that includes a container defining a compartment or reservoir for the receipt of nuts therewithin, conveyor means passing through such compartment for removing nuts one-by-one therefrom and for advancing the same in spaced apart succession into a cracking station, and nut-cracking means at such station and including both anvil structure and hammer structure aligned therewith.

U.S. Pat. No. 4,377,970 for NUT CRACKER issued Mar. 29, 1983 to Kenkel, discloses a nut cracker that includes a base that supports an adjustably fixed anvil member and a moveable ram member under the control of a handle, there being a guide interconnecting the ram member with the base which maintains the ram member in an erect position. The confronting faces of the anvil member and the ram member are provided with recesses into which the ends of the nut are received with clearance so that the outer rim of such recesses engage the nut to provide the cracking force to the shell remotely from the ends of the nut. With this construction, a heavy-duty unit is provided which is especially useful for cracking nuts that have hard or strong shells such as black walnuts and butternuts, and the construction further enables the shells to be broken and nut meats recovered in larger pieces without over-cracking.

U.S. Pat. No. 4,466,343 for AUTOMATIC ADJUSTING NUTCRACKER issued Aug. 21, 1984 to Thompson, discloses a nutcracker including a base, a stationary jaw, and an adjustable post. A driving cylinder is urged along the longitudinal axis of the post by a lever connected through a connecting link. A spring allows the post to float until a canting pin contacts one end of a ring disposed around the post. When the ring cants to contact the post, the force applied to the driving cylinder is translated directly to the post to crack a nut disposed between the stationary jaw and the moveable jaw.

U.S. Pat. No. 4,467,711 for METHOD AND APPARATUS FOR CRACKING NUTS issued Aug. 28, 1984 to Oiso et. al., discloses a nut cracking apparatus including a conveyor comprised of parallel slats connected to endless chains for intermittent movement from a hopper to a nut gripping and cracking apparatus. Each slat is provided with a row of openings extending therethrough for receiving nuts from the hopper and an underlying support is provided to retain the nuts in the openings until each slat is moved in sequence to a plurality of cracking apparatus. Each nut is located between an upper and lower nut gripping block each of which has a recess therein with a slot at the bottom thereof. The lower nut gripping block is spring biased on a fixed blade to normally have the blade retracted out of the recess. The upper nut gripping block is spring biased on an opposed blade which in turn connected to the piston of a hydraulically operated piston and cylinder device. Upon lowering of the upper blade toward the lower blade a nut is gripped between the upper and lower blocks and continued downward movement of the blade will cause the upper and lower blades to penetrate into the recesses to cut the shell of the nut into two pieces without damaging the kernel of the nut. Upon cutting of the shell into two pieces, the upper blade is retracted and the upper and lower nut gripping blocks are spring biased back to their normal position.

U.S. Pat. No. 4,665,814 for IMPACTING NUT CRACKER issued May 19, 1987 to Harborne et. al., discloses an impacting nut cracker which utilizes an impacting plunger activated by a compression spring or electrical solenoid to deliver a sharp blow to an aligned adjustable anvil to provide a stroke of measured distance to a nut confined against a tailstock anvil. A slidable and transparent guard cover over the impact area prevents excessive dispersion of the fragmented shell. A concavity in the tailstock anvil and in the adjustable anvil causes a circular edge to engage each end of the nut to cause circular fractures beneficial in achieving greater uniformity in the fracture pattern of the shell.

U.S. Pat. No. 4,787,307 for NUTCRACKER issued Nov. 29, 1988 to Rollband, discloses a nutcracker mounted on a base that grips a nut to be cracked between a moveable piston and an adjustable anvil. The user sets the optimum cracking distance initially by lining up an index marker located on the piston and adjusting the anvil to firmly hold the opposite end of the nut. Thereafter, the user need only move the lever handle to its up position and insert the nut—no further adjustment is necessary for similar size nuts. The user then moves the piston a limited distance by activating the lever handle connected to the piston through a toggle joint, or other limited movement arrangement. This limited movement enables the inventive nutcracker to crack the nutshell without damaging the meat inside.

U.S. Pat. No. 4,838,155 for NUTCRACKER APPARATUS issued Jun. 13, 1989 to Steffel, discloses a nutcracker apparatus that includes a frame on which there is provided a front and a rear head assembly that each has a head which is resiliently urged toward the other but is limited in such movement by a knife at least in part located in a slot in the head. Each knife is mounted on a rod, the rear rod being moveable toward the front rod to initially clamp the nut and as the movement of one head toward the other is limited by the uncracked nut, the rear knife continues to move toward the front knife to crack and/or split the nut.

U.S. Pat. No. 5,092,231 for NUT CRACKER issued Mar. 3, 1992 to Smith, discloses a nut cracker designed to accommodate virtually any size nut and provide the same degree of cracking stroke with the same mechanical advantage irrespective of nut size, with only a simple thumb-screw adjustment of a cam.

U.S. Pat. No. 6,209,448 for NUT CRACKING MACHINE issued Apr. 3, 2001 to Hagen, discloses a nut cracking machine that comprises a cylinder mounted in bearings for rotation n about a long axis of the cylinder. The cylinder has projections extending radially from its cylindrical surface. An anvil plate is held at a fixed predetermined distance from the cylinder when the machine is in operation. The cylinder is power driven. A feed hopper is provided for receiving nuts and directing the nuts onto the cylinder, the cylinder rotating in a direction to direct an upper part of the cylinder toward the anvil plate member, toward and increasingly restricted space between the cylinder and the anvil plate.

None of the patents, taken singly, or in any combination are seen to teach or suggest the novel method and apparatus for cracking the shells of walnuts or similar nuts, while minimizing the fracturing of the edible nutmeat within the nut.

The present invention represents a new and improved method of precisely opening hard shelled nuts while concomitantly preserving the nutmeat located therein. It is believed that such a method represents a significant advancement in the art.

SUMMARY OF THE INVENTION

According to one embodiment of the invention, there is disclosed an apparatus and method of cracking hard shelled nuts by providing a number of pairs of axially aligned, spaced-apart, opposing pairs of cylindrical tubes combined with a linear compression device. By aligning a pair of cylindrical tubes inside a linear compression device and placing a hard shelled nut intermediate the cylindrical tubes, a linear compression force is applied to the pair of cylindrical tubes. With a hard shelled nut located between the openings of a pair of tubes, the hard shelled nut exterior shell casings are separated from interior nutmeats, with the nutmeats being minimally damaged during the process. A tangential circumferential translational application of a linear compression force results in the shell of nut being explosively decoupled from the internal nutmeat.

BRIEF DESCRIPTION OF THE DRAWINGS

Various objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENT

For a better understanding of the present invention, together with other and further objects, advantages and capabilities thereof, reference is made to the following disclosure and appended claims in connection with the above-described drawings. Like figure numbers are used from drawing figure to drawing figure to identify like elements in these drawings.

While applicable to many types of hard nuts, the present invention is particularly well suited to cracking black walnuts, a nut considered difficult to crack without damaging the nutmeat. While black walnuts have been chosen for purposes of disclosure, it will be recognized that the novel apparatus and method of the invention may be used with other similar nuts. Consequently, the invention is not considered limited to the black walnuts chosen for purposes of disclosure.

Black walnuts as well as many other nuts have an outer hull surrounding the hard nut. Prior to cracking hard nuts, it is necessary to remove any outer hull present. A tried and true way to remove the hulls from walnuts and other hulled varieties of nuts involves emptying a bucket of hull bearing nuts into a cement mixer and adding three to four inch diameter stones. Water is added and the mixer is run and hulls are ground off the nuts. Once de-hulled, the nuts are typically placed onto an elevated metal screen and they are washed in a bucket of water. Any nuts that float to the surface are typically discarded, since they are not desirable to consume. The remaining washed nuts are dried in a single layer prior to attempting to crack them.

Experimentation has shown that black walnuts can easily and effectively be cracked by placing them between two pieces of five-eighths inch inside diameter steel pipe and using a machinist bench vise to compress the nut between the two pieces of pipe. The alignment of the nut between the two pieces of steel pipe is generally axially in-line with the steel pipe, such that the poles of the nut are aligned with and placed into the hollow portion of the pipe. The cracking of the shell may result in particles of the shell sticking on the sharp edge of the inner wall of the pipe, so approximately a forty-five degree chamfer is added to the inside diameter of the cracking end of the pipe sections to alleviate this from happening.

Figure 1:
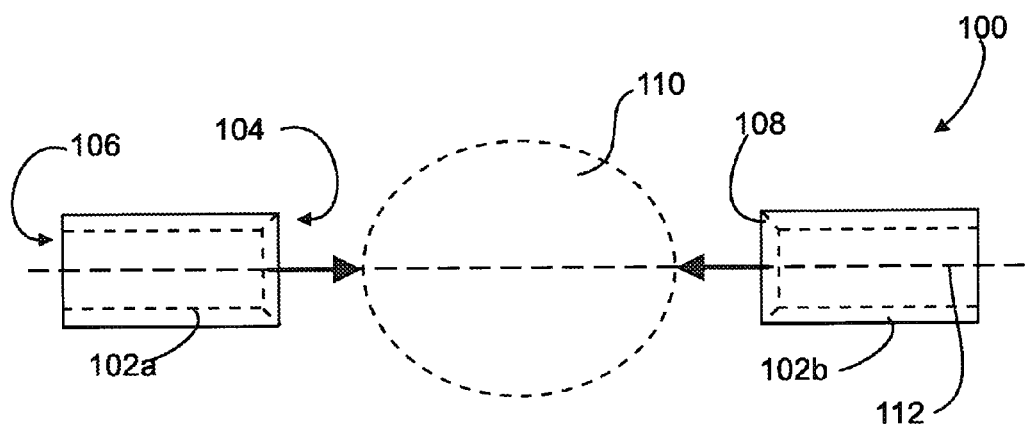
FIG. 1 is a side elevational, schematic, cross-sectional view of a first embodiment of the invention.

Referring now to FIG. 1, there is shown a side elevational view of nut cracker in accordance with the invention, generally at reference number 100. Two similar hollow cylinder sections 102a, 102b, each having a proximal end 104, a distal end 106 and a chamfer 108 disposed at one or both of proximal end distal ends 104, 106, respectively. Chamfer 108 helps to reduce the accumulation and adherence of dislodged debris and particles to the ends of cylinders 102a, 102b as well as assisting in aligning a nut 110 centrally in the centers, not specifically identified, of hollow cylinders 102a, 102b. A nut 110 is disposed between a chamfered proximal end 104 of each hollow cylinders 102a, 102b. Once nut 110 is placed between hollow cylinders 102a, 102b, a linear force is applied axially to hollow cylinders 102a, 102b create an over-pressure condition of the hard nut 110 shell casing. The applied force is further concentrated by circular contact area created by chamfer 108 of hollow cylinders 102a, 102b, with additional inward directed force created by the contact surface area between hollow cylinders 102a, 102b and nut 110 due to chamfer 108.

The resulting tangential circumferential translational application of linear compression force causes the shell of nut 110 to explosively decouple from the internal nutmeat, not specifically identified, housed within the shell. It is beneficial to select a diameter of hollow cylinders 102a, 102b that is generally less than the diameter of the nut 110 needing to be cracked, but more than the internal diameter of the nutmeat or kernel, not specifically identified. This selection applies the linear compression force in such a way that when the shell of nut 110 is compressed beyond its elastic limit and a breach is formed, the potential energy that was stored with the application of linear force is released in the instant after the breach is formed. The shell absorbs almost all the energy, with a minimal amount going into the nutmeat wherein the shell is deconstructed into numerous large pieces with the nutmeat being in a relatively untouched condition. The diameters of hollow cylinders 102a and 102b may be chosen to be different sizes to accommodate non-circular nut shapes. Also important to successful nut cracking is a polar orientation of the nut 110 to the axis 112 of the hollow cylinders 102a, 102b. If a nut 110 is not placed between hollow cylinders 102a, 102b in polar alignment, the application of the resulting off axis compression force may result in destructive force being introduced into the nutmeat or kernel section.

A hand held tool can easily be made to crack hard shelled nuts (particularly black walnuts) in a bench vise. Also two hollow cylinders (e.g., pieces of this pipe) may be added as an attachment to a machinist bench vise by using a threaded steel stud that screws into the jaw of the vise and a section of steel pipe would slide onto the stud. A tool can be made to crack more than one walnut by using more pieces of steel pipe in the tool.

Because of this successful way to crack the nut, a new way to crack hard shelled nuts uses a hollow jaw nut cracking vise similar to a machinist bench vise, and is illustrated for the case of cracking black walnuts. Since a five-eighths inch steel pipe has a five-eighths inch hole in it, the jaws of this vise would have a five-eighths inch hole through them and is chamfered accordingly. A properly sized handle would give enough power to the vise so that a young boy could easily crack black walnuts. The jaws are elongated so that a person's hand can easily hold the nut while it is being cracked. This also prevents pieces of the nut from falling or flying away. Once pressure is applied to the nut, closing of the jaws approximately one-eighth of an inch can successfully shatter the outside wall of the walnut. The application of force can be finely controlled using a standard vise allowing for individual adjustments to different sizes, types, and shapes of nuts. Very often four whole nutmeats are freed from the cracked shell. But since two snowflakes are not exactly the same, neither can we expect two black walnuts to be the same. So the results of the cracking of individual nuts is that they do not always crack the same.

When the results of cracking a hard nut using the novel apparatus of FIG. 1 in the manner described are compared with the results received from a tradition nut cracking device and method, the superior result obtained by the novel device and methods may more readily be appreciated. It is well know and widely practiced to use a hammer, not shown, to strike a hard nut 110 thereby creating an over-pressure condition to crack the nut 110. The application of force in this manner allows a larger proportion of the applied force to be transmitted to the nutmeat therefore creating a situation where the nutmeat and shell become fragmented and end up being mixed together, requiring a time consuming separation of the pieces.

Figure 2:
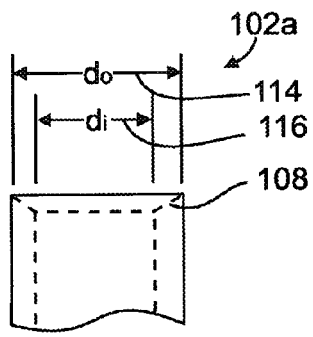
FIG. 2 is an end elevational, schematic view of one of the cylinders of the apparatus of FIG. 1.

Referring now also to FIG. 2, there is shown an end elevational view of hollow cylinder 102a, hollow cylinder 102a has an outside diameter $d_o$ 114 and an insider diameter $d_i$ 116. A chamfer 108 disposed between $d_o$ 114 and $d_i$ 116 creates a circular point of contact when a nut 110 is placed thereagainst.

Figure 3A:
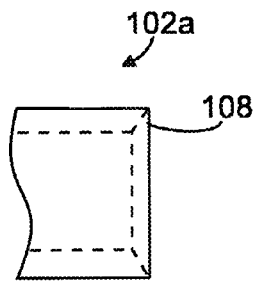
FIG. 3a is a side elevational schematic of the cylinder of FIG. 2 showing a chamfer.
Figure 3B:
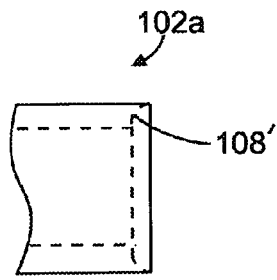
FIG. 3b is a side elevational schematic cross-sectional view of the cylinder of FIG. 2 showing a circular relief.

As may readily be seen in FIGS. 3a and 3b, chamfer 108 may be replaced by curvilinear relief between $d_o$ 114 and $d_i$ 116. Consequently, the invention is not considered limited to chamfer 108 chosen for purposes of disclosure. Rather, the invention is intended to include any transition between $d_o$ 114 and $d_i$ 116 that results in the force between the distal ends of hollow cylinders 102a, 102b, respectively, being transferred to nut 110 when compressed therebetween.

Figure 3C:
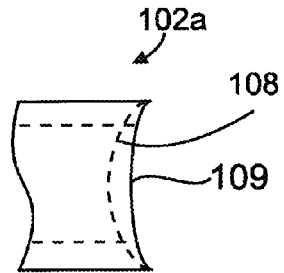
FIG. 3c is a side elevational schematic cross-sectional view of the cylinder of FIG. 2 showing a saddle shaped relief.

Referring now also to FIG. 3c, saddle point 109 can ease the alignment of nut 110 between hollow cylinders 102a, and may result in an increased contact surface area whereby the pressure required to fracture the shell of the nut is increased with the result being a more consistent fracture of the shell, while the end structure embodied in FIGS. 3a and 3b create an unbalanced force due to the nut not being round that creates two oppositely disposed cracks in the shell.

Figure 4:
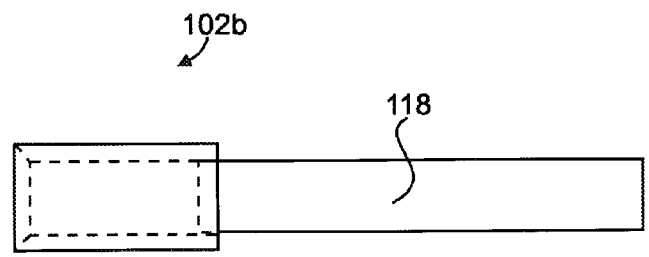
FIG. 4 is a side elevational, schematic, cross-sectional view of a debris removal tool.

Referring now also to FIG. 4, there is shown a side elevational view of the hollow cylinder 102a or 102b. A solid cylinder 118 having an outside diameter, not specifically identified, slightly smaller than inside diameter $d_i$ 114 of hollow cylinder 102a, 102b is inserted into a respective distal end 106 of hollow cylinder 102a, 102b to remove remaining pieces of the deconstructed shell of nut 110 from within the circular recess of hollow cylinder 102a, 102b. Solid cylinder 118 could also be a hollow cylinder, a dowel, or a bottle brush and achieve the same result.

Figures 5A, 5B:
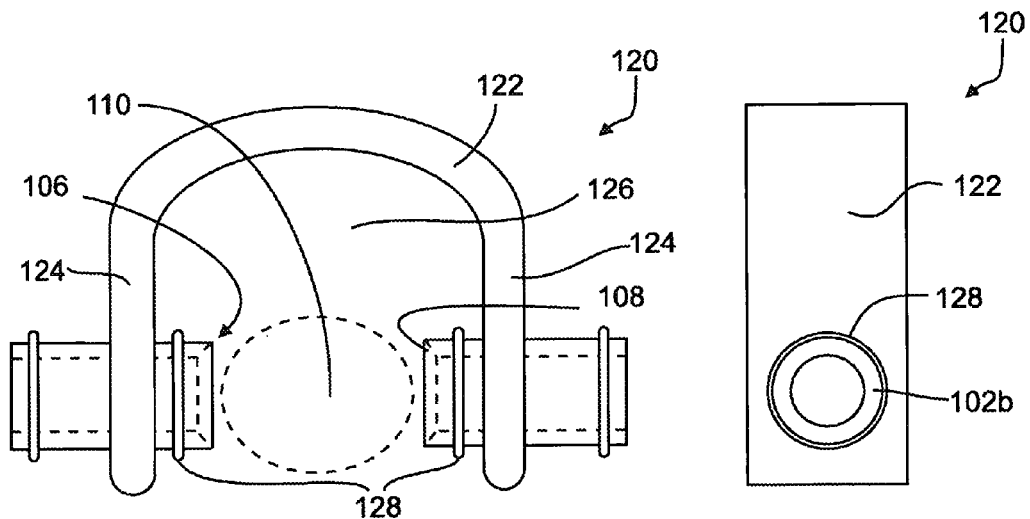
FIG. 5 is a side elevational view of first alternate embodiment of a nut cracking apparatus in accordance with the invention.

Referring now also to FIGS. 5a and 5b, there are shown a front elevational and a right side elevational view, respectively, of a first alternate embodiment of the nut cracking apparatuses of the invention, generally at reference number 120. A thin, semi-flexible U-shaped member 122 has a hollow cylinder 102a, 102b inserted through each leg 124 thereof. The orientation of each hollow cylinder 102a, 102b is such that chamfered proximal ends 104 thereof point inwardly toward a central region 126 of nut cracking apparatus 120. Bands 128 constrain hollow cylinders 102a, 102b within U-shaped member 122. Nut cracking apparatus 120 makes easier the task of applying axial pressure to nut 110. Other methods to constrain hollow cylinders 102a, 102b could be used. Any projection from the surface of the hollow cylinders, such as a pin stop, a setscrew, or other features would serve to restrain the hollow cylinders within each leg 124.

In operation, a nut 110 is placed into apparatus 120 between hollow cylinders 102a, 102b and a slight pressure holds nut 110 in place while apparatus 120 is placed between the jaws of a vise, not shown. Tightening the vise jaws ultimately cracks nut 110.

The embodiments shown and described in FIGS. 1 through 5 generally require the application of force from an external source, such as a bench vise (not shown). However, the embodiments of FIGS. 6 and 7 describe self-contained embodiments of the present invention that integrates the means for applying force to the nut 110 with hollow cylinders 102a, 102b.

Figure 6:
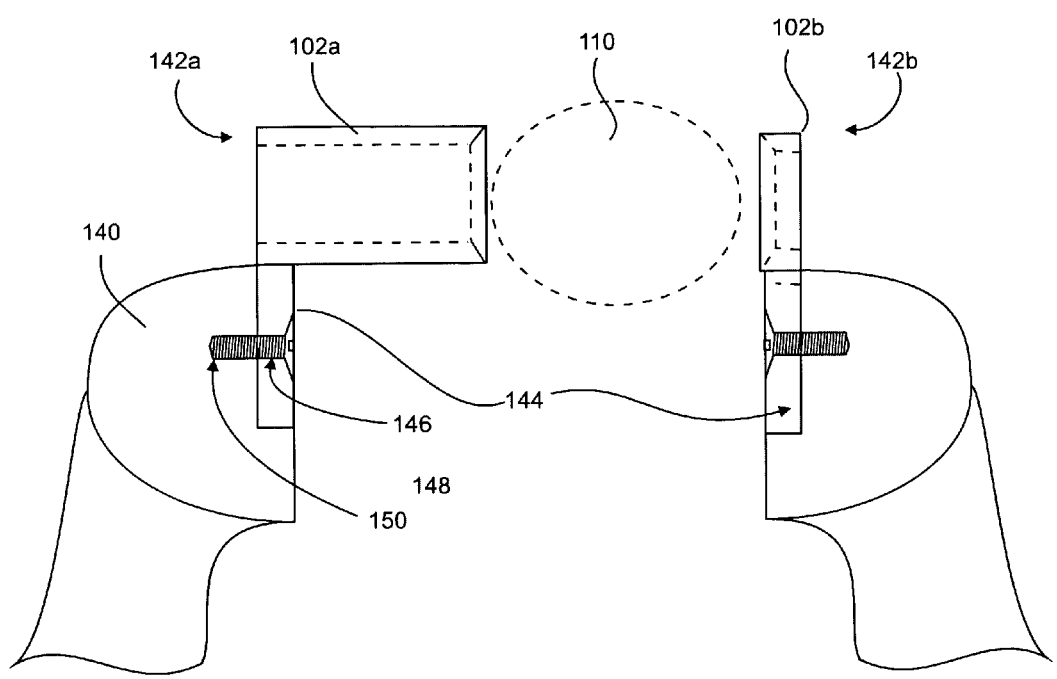
FIG. 6 is a side elevational view of second alternate embodiment of a nut cracking apparatus attached to a vise in accordance with the invention.

Referring now also to FIG. 6 there is shown a side, elevational, cross-sectional view of a portion of the jaws 140 of a typical bench vise having removable jaw plates replaced with two new replacement jaws members 142a, 142b (142b not identified on FIG. 6). Jaw members 142a, 142b incorporate hollow cylinders 102a, 102b, respectively. Replacement jaw members 142a, 142b have a mounting flange 144 attached longitudinally to hollow cylinders 102a, 102b. Mounting flanges 144 have a through hole 146 sized and configures to receive a threaded fastener 148 (e.g., machine screw, bolt, etc.). Threaded fastener 148 is sized and configured to be received and maintained in a threaded hole 150 in the face of each of jaw portions 140. Replacement jaw members 142a, 142b allow retrofitting an existing bench vise or the like, not specifically identified, into a self-contained nut cracking apparatus in accordance with the invention.

Figure 7:
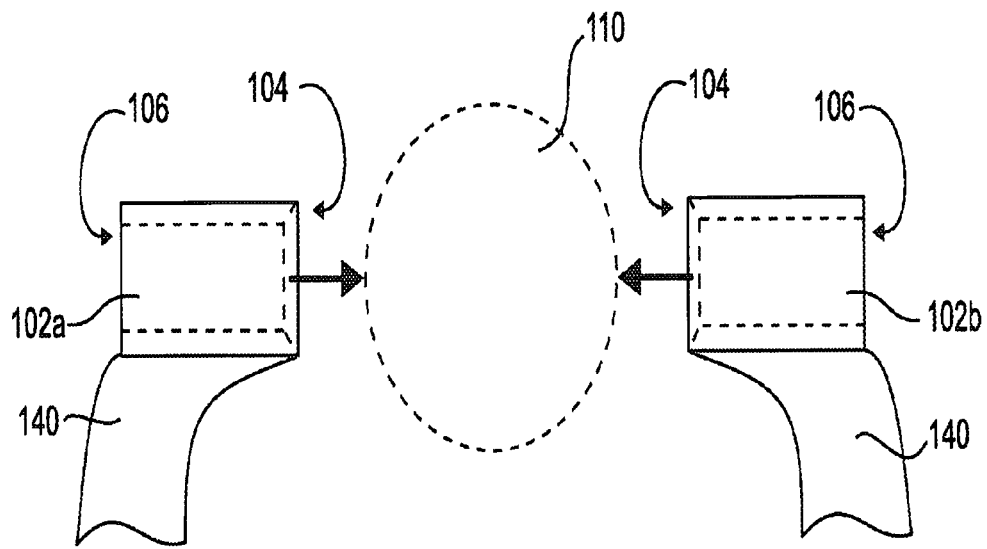
FIG. 7 is a side elevational view of a third alternate embodiment of a nut cracking apparatus formed as a portion of a vise.
Figure 8:
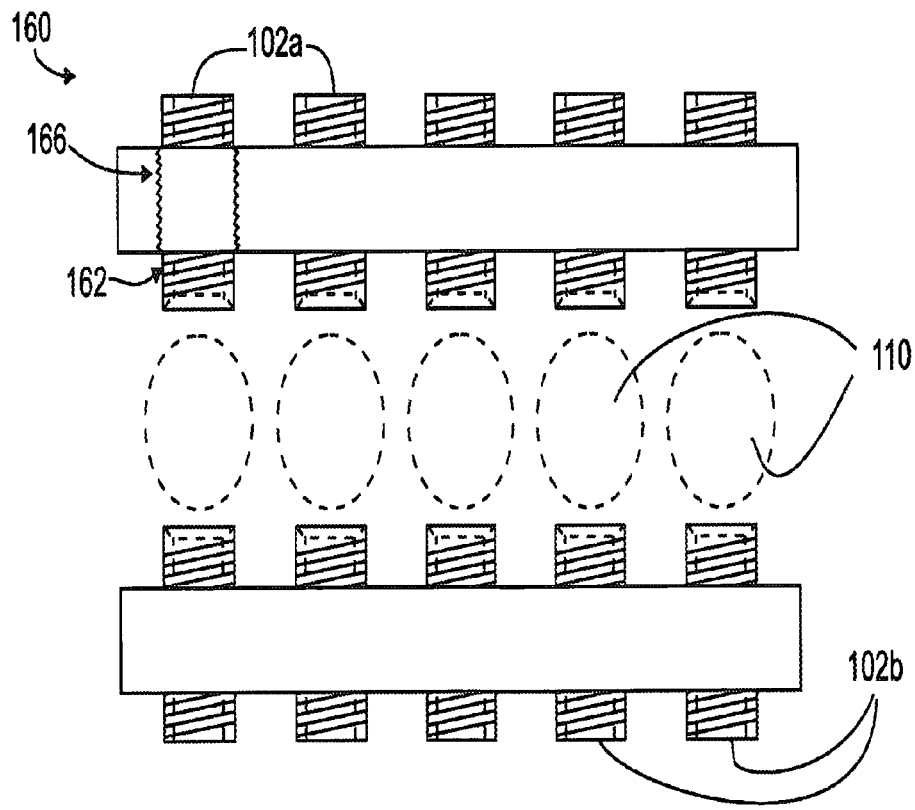
FIG. 8 is a top plan view of a multi-place nut cracker in accordance with the invention.

Referring now also to FIG. 7, there is shown a side elevational, schematic view of a vise having hollow cylinders 102a, 102b permanently attached to vise jaws 140 to form a dedicated nut cracking apparatus Referring now also to FIG. 8, there is shown a top plan view of a multi-place nut cracker 160. A plurality of hollow cylinders 102a each has outside threads 162. A first support block 164a contains a plurality of spaced-apart, threaded through holes 166 each adapted to receive and retain one of the plurality of externally threaded hollow cylinders 102a. A second support block 164b also contains a plurality of threaded through holes 166, each of which being adapted to receive one of the plurality of externally threaded hollow cylinders 102b. Chamfers 108 associated with each of externally threaded hollow cylinders 102a, 102b face each other as in the nut cracking apparatus 120 of FIGS. 4a and 5b.

While the term "vise" has been used as a device capable of applying axial forces to a nut 110 via a pair of hollow tubes 102a, 102b aligned with a nut axially alighted therebetween, it will be recognized by those of skill in the art that many other devices may be utilized to axially apply cracking force. Consequently, the invention is not considered limited to devices such as vises to apply cracking pressure. Rather the invention is intended to include any other device capable of generating and axial force and applying such force to a nut through a pair of hollow cylinders.

The foregoing description illustrates and describes the present invention. Additionally, the disclosure shows and describes selected embodiments of the invention but, as mentioned above, it is to be understood that the invention is capable of use in various other combinations, modifications, and environments and is capable of changes or modifications within the scope of the inventive concept taught herein commensurate with the above teachings and/or the skill or knowledge of the relevant art. The embodiments described are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include such alternative embodiments.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. An apparatus for cracking hard shelled nuts, comprising: at least two open ended, hollow cylindrical tubes having an exterior diameter less than a diameter of a hard shelled nut to be cracked, said at least two open ended, hollow cylindrical tubes each having a proximal end and a distal end, Said proximal ends thereof, said at least two open ended, hollow cylindrical tubes being held in axial alignment with one another by a common support structure slidably attached to each thereof, and with said respective proximal ends facing one another and spaced apart from one another, a space therebetween accommodating a hard shelled nut to be cracked, said distal end of each of said at least two cylinders being adapted to receive a linear compressive force thereat whereby said linear compressive force forces each of said at least two cylindrical tubes towards one another so as to exert a force on a hard shelled nut placed therebetween.

2. The apparatus of claim 1, wherein said chamfer extends radially inward therethrough each of said at least two hollow cylindrical tubes proximate said proximal end thereof.

3. The apparatus of claim 2, further comprising a structure attached to each of said at least two hollow cylindrical tubes that maintains said axial, spaced apart relationship therebetween, said structure being flexible such that said at least two hollow cylindrical tubes may move toward one another to provide a cracking force to a nut placed between respective proximal ends of said at least two hollow cylindrical tubes.

4. The apparatus of claim 1, wherein at least one of said at least two hollow cylindrical tubes comprises a length of five-eighths inch inside diameter tube.

5. The apparatus of claim 4, wherein said at least two cylindrical tubes comprises material chosen from the group of: ferrous, non-ferrous, and alloys thereof.

6. The apparatus of claim 1, wherein said plurality of at least two cylindrical tubes further comprises a first support block containing a plurality of holes each adopted to receive and retain one of said cylindrical tubes, and a second support block containing a plurality of holes each adopted to receive and retain one of said cylindrical tubes.

7. The apparatus of claim 6 wherein said cylindrical tubes are externally threaded, and said plurality of holes in said first block and said second block are threaded holes adapted to receive and retain said externally threaded cylindrical tubes.

8. The apparatus of claim 1, further comprising positioning of said distal end of each of said at least two cylinders adjacent a linear compression source.

9. The apparatus of claim 8, wherein said linear compression source is chosen from the group: mechanical, hydraulic, electrical, and hand operated.

* * * * *